United States Patent
Hatoh et al.

(10) Patent No.: US 7,452,624 B2
(45) Date of Patent: Nov. 18, 2008

(54) POLYMER ELECTROLYTE TYPE FUEL CELL

(75) Inventors: Kazuhito Hatoh, Osaka (JP); Junji Niikura, Hirakata (JP); Teruhisa Kanbara, Toyonaka (JP); Hideo Ohara, Katano (JP); Hiroki Kusakabe, Sakai (JP); Nobuhiro Hase, Mino (JP); Shinsuke Takeguchi, Kadoma (JP); Susumu Kobayashi, Ikoma (JP); Tatsuto Yamazaki, deceased, late of Moriguchi (JP); by Masayo Sugou, legal representative, Tokyo (JP)

(73) Assignee: Panasonic Corporation, Osaka (JP)

( * ) Notice: Subject to any disclaimer, the term of this patent is extended or adjusted under 35 U.S.C. 154(b) by 649 days.

(21) Appl. No.: 10/312,812

(22) PCT Filed: Feb. 14, 2002

(86) PCT No.: PCT/JP02/01275

§ 371 (c)(1),
(2), (4) Date: Oct. 1, 2003

(87) PCT Pub. No.: WO02/065567

PCT Pub. Date: Aug. 22, 2002

(65) Prior Publication Data

US 2004/0214066 A1      Oct. 28, 2004

(30) Foreign Application Priority Data

Feb. 15, 2002   (JP)   ............................. 2001-039246

(51) Int. Cl.
*H01M 8/00*    (2006.01)
*H01M 8/10*    (2006.01)
*H01M 2/14*    (2006.01)

(52) U.S. Cl. .............................. 429/38; 429/12; 429/30
(58) Field of Classification Search ....................... None
See application file for complete search history.

(56) References Cited

U.S. PATENT DOCUMENTS

| 4,532,169 | A  | * | 7/1985 | Carley .......................... 428/109 |
| 6,180,275 | B1 | * | 1/2001 | Braun et al. .................. 429/34 |
| 6,451,469 | B1 | * | 9/2002 | Nakamura et al. ............ 429/36 |
| 2004/0058214 | A1 | * | 3/2004 | Mehler et al. ................. 429/30 |

FOREIGN PATENT DOCUMENTS

| EP | 0 081 004 |     | 6/1983 |
| EP | 0 933 825 | A2  | 10/1999 |
| EP | 1 061 597 |     | 12/2000 |
| GB | 2 157 482 |     | 10/1985 |
| JP | 74913/1991 |    | 7/1991 |

(Continued)

*Primary Examiner*—Patrick Ryan
*Assistant Examiner*—Julian Mercado
(74) *Attorney, Agent, or Firm*—McDermott Will & Emery LLP (57) ABSTRACT

A polymer electrolyte fuel cell of the present invention includes conductive separator plates comprising molded plates of a composition comprising a binder, conductive carbon particles whose average particle diameter is not less than 50 μm and not more than ⅓ of the thickness of the thinnest portion of the conductive separator plate, and at least one of conductive carbon fine particles and micro-diameter carbon fibers. The separator plates do not require conventional cutting processes for gas flow channels, etc., and can be easily mass produced by injection molding and achieve a reduction in the cost.

10 Claims, 4 Drawing Sheets

FOREIGN PATENT DOCUMENTS

| | | |
|---|---|---|
| JP | 04-214072 | 5/1992 |
| JP | 6-333580 | 12/1994 |
| JP | 10-334927 A | 12/1998 |
| JP | 11-140591 | 5/1999 |
| JP | 11-156908 | 6/1999 |
| JP | 11-335782 | 12/1999 |
| JP | 11-345620 A | 12/1999 |
| JP | 2000-40517 A | 2/2000 |
| JP | 2000-82476 A | 3/2000 |
| JP | 2000-331690 A | 11/2000 |
| JP | 2001-126744 A | 5/2001 |
| JP | 2001-236966 A | 8/2001 |
| JP | 2002-83608 A | 3/2002 |
| WO | WO 97/43116 | 11/1997 |

* cited by examiner

POLYMER ELECTROLYTE TYPE FUEL CELL

TECHNICAL FIELD

The present invention relates to a fuel cell using a polymer electrolyte membrane for use in portable power sources, electric vehicle power sources, domestic cogeneration systems, etc.

BACKGROUND ART

A fuel cell using a polymer electrolyte membrane generates electric power and heat simultaneously by electrochemically reacting a fuel gas containing hydrogen and an oxidant gas containing oxygen such as air. This fuel cell is basically composed of a polymer electrolyte membrane for selectively transporting hydrogen ions; and a pair of electrodes, i.e., an anode and a cathode, formed on both surfaces of the polymer electrolyte membrane. The electrode usually comprises a catalyst layer which is composed mainly of a carbon powder carrying a platinum group metal catalyst and formed on the surface of the polymer electrolyte membrane; and a diffusion layer which has both gas permeability and electronic conductivity and is formed on the outer surface of the catalyst layer.

In order to prevent the fuel gas and oxidant gas supplied to the electrodes from leaking out or prevent these two kinds of gases from mixing together, gaskets are arranged on the periphery of the electrodes with the polymer electrolyte membrane therebetween. The gaskets are combined integrally with the electrodes and the polymer electrolyte membrane beforehand. This is called "MEA" (electrolyte membrane-electrode assembly). Disposed outside the MEA are conductive separator plates for mechanically securing the MEA and for connecting adjacent MEAs electrically in series, or in some cases, in parallel. The separator plates have a gas flow channel for supplying a reaction gas to the electrode surface and for removing a generated gas and an excess gas, in a portion that comes into contact with the MEA. Although the gas flow channel may be provided separately from the separator plates, grooves are usually formed on the surfaces of the separator plates to serve as the gas flow channel. Also, a method in which the gas flow channel grooves are formed on the electrodes has been proposed, depending on the circumstances.

In order to supply the fuel gas and oxidant gas to these grooves, it is necessary to use piping jigs which branch respective supply pipes for fuel gas and oxidant gas, according to the number of separator plates to be used, and connect the branches directly to the grooves of the separator plates. This jig is called "manifold", and the above-described type, directly connecting the supply pipes for fuel gas and oxidant gas with the grooves, is called "external manifold". A manifold having a simpler structure is called "internal manifold". In the internal manifold, the separator plates with the gas flow channels formed thereon are provided with through holes which are connected to the inlet and outlet of the gas flow channel such that the fuel gas and oxidant gas are supplied directly from these holes.

Since the fuel cell generates heat during operation, it needs cooling with cooling water or the like to keep the cell under good temperature conditions. Normally, a cooling section for flowing the cooling water therein is formed every one to three cells. The cooling section is inserted between the separator plates in one structure, and the cooling section is formed by providing the backsides of the separator plates with a cooling water flow channel in the other structure. The latter structure is often employed. In a general structure of a cell stack, the MEAs, separator plates and cooling sections are alternately stacked to form a stack of 10 to 200 cells, and the resultant stack is sandwiched by end plates with current collector plates and insulating plates and is clamped with clamping bolts from both sides.

In such a polymer electrolyte fuel cell, the separator plates need to have high conductivity, high tightness against the fuel gas, and high corrosion resistance against a reaction in hydrogen/oxygen oxidation-reduction. For such reasons, conventional separator plates are made from a glassy carbon plate or a dense graphite plate, and produced by forming a gas flow channel on the surface thereof by cutting, or by placing an expanded graphite powder together with a binder in a press mold with a gas flow channel formed thereon and by heating/baking them after pressing.

In recent years, there have been attempts to use a metallic plate such as stainless steel in place of conventionally used carbon materials. In the case of the separator plate using a metallic plate, however, since the metallic plate is exposed to acidic atmosphere at high temperatures, corrosion and dissolution of the metallic plate will occur when used in a long time. If the metallic plate is corroded, the electrical resistance in the corroded portion increases, and the output of the cell decreases. Besides, if the metallic plate is dissolved, the dissolved metal ions diffuse into the polymer electrolyte and trapped at the ion exchange site of the polymer electrolyte, and consequently the ionic conductivity of the polymer electrolyte decreases. In order to prevent such deteriorations, the surface of the metal plate is normally plated with gold having a certain thickness. Furthermore, separator plates made of a conductive resin obtained by mixing a metal powder with an epoxy resin or the like have been examined (for example, Japanese Laid-Open Unexamined Patent Publication No. 6-333580).

As described above, in the conventional method of producing a separator plate by cutting a glassy carbon plate or the like, the cost of the material of glassy carbon plate is high, and, further, it is difficult to reduce the cost of cutting the glassy carbon plate. In the case of a separator plate produced by pressing expanded graphite, in order to retain the high conductivity of the separator plate, the content of the expanded graphite in the separator plate needs to be made 80 wt % or more. Accordingly, there arises a problem in the dynamic strength of the material. Therefore, the separator plate sometimes had cracks, which were caused by a deviation of the clamping load of the cell stack due to a variation in the thickness of the separator plate, more particularly vibration and impact during driving when used as the power source of an electric vehicle. If carbon fibers are added, the strength is improved, but it becomes difficult to perform injection molding as the flowability of a binder resin decreases. Furthermore, the metallic separator plates with gold plating have a problem with the cost of the gold plating. A separator plate made from a conductive resin has a lower conductivity compared to glassy carbon and metal plates, and the surface of the resin is hard. Therefore, in order to decrease the electric resistance in the portion in contact with the electrode, clamping needs to be performed at a higher pressure, and thus there is a problem that the cell structure becomes complicated.

It is an object of the present invention to provide low-cost conductive separator plates having a low volume resistivity by improving conductive separator plates composed of a binder and a conductive material consisting mainly of conductive carbon particles.

The present invention also provides a method for manufacturing such a conductive separator plate.

DISCLOSURE OF INVENTION

The present invention provides a polymer electrolyte fuel cell comprising conductive separator plates made of molded plates of a composition comprising a binder, conductive carbon particles, and at least one of conductive carbon fine particles and micro-diameter carbon fibers.

Here, the average particle diameter of the conductive carbon particles is not less than 50 μm, and is not more than ⅓ of the thickness of the thinnest portion of the conductive separator plate, preferably not more than 200 μm.

Preferred conductive carbon fine particles are carbon fine particles having a peak of the particle size distribution at an average diameter of 30 to 100 nm.

A preferred conductive micro-diameter carbon fiber is a carbon fiber having a diameter of 10 to 30 nm and a length of 1 to 10 μm.

The present invention provides conductive separator plates further comprising a metallic filler.

The present invention provides a method for manufacturing a conductive separator plate for use in a polymer electrolyte fuel cell, comprising the steps of preparing molding pellets comprising the above-mentioned composition, and injection molding the pellets.

BEST MODE FOR CARRYING OUT THE INVENTION

The present invention relates to a polymer electrolyte fuel cell comprising: a hydrogen ion conductive polymer electrolyte membrane; a pair of electrodes sandwiching the hydrogen ion conductive polymer electrolyte membrane therebetween; and a pair of conductive separator plates including means for supplying and discharging a fuel gas to and from one of the electrodes and supplying and discharging an oxidant gas to and from the other electrode, wherein the conductive separator plates comprise molded plates of a composition comprising a binder, conductive carbon particles whose average particle diameter is not less than 50 μm and not more than ⅓ of the thickness of the thinnest portion of the conductive separator plate, and at least one of conductive carbon fine particles and micro-diameter carbon fibers.

The conductive separator plates of the present invention have a low electric conductivity compared to glassy carbon plates and metal plates. However, since these conductive separator plates can be prepared by injection molding, there is no need to perform the cutting processes for gas flow channels, etc., which were necessary in the production of conventional separator plates, thereby achieving an improvement in the productivity and a reduction in the cost.

By arranging the conductive carbon particles to be ⅓ or less than the thickness of the thinnest portion of the conductive separator plate, the moldability is improved, and the gas permeability of the resultant separator plates decreases.

In the conductive separator plates of the present invention, the conductive carbon fine particles and/or micro-diameter carbon fibers are dispersed in the binder for bonding the conductive carbon particles together, thereby imparting conductivity to the binder.

A preferred conductive carbon particle has a length-to-width ratio (length/width), i.e., an aspect ratio, of not less than 2. Typical preferred carbon particles are those having an elongated shape like grains of rice. A composition containing such carbon particles flows well during the injection molding of the separator plates. Moreover, the particles in the separator plates to be molded can be oriented at random, thereby improving the conductivity of the separator plates.

In a preferred embodiment of the present invention, the separator plates further comprise a metallic filler. The metallic filler performs the function of electrically connecting the carbon particles together. Consequently, the volume resistivity of the separator plates becomes lower.

Like the conductive carbon particles, a preferred metallic filler is not more than ⅓ of the thickness of the thinnest portion of the conductive separator plate, more preferably not more than 200 μm. The preferred metallic filler has a length-to-width ratio of not less than 2.

If the metallic filler that is exposed on the surface of separator plate is a material such as silver that is corroded in an acidic atmosphere, it is preferable to remove the filler by dissolving, etc.

In a preferred embodiment of the present invention, the binder is made of a thermoplastic resin.

Examples of the thermoplastic resin are polyethylene, polystyrene, polypropylene, polymethyl methacrylate, polyethylene terephthalate, polycarbonate, polyamide, polyimide, polyvinyl alcohol, polyphenylene sulfide, polyether ketone, polyether imide, fluorocarbon resin, ester resin, liquid crystal polymer, aromatic polyester, polyacetal, and polyphenylene ether.

In another preferred embodiment of the present invention, the binder is made of a gastight elastic body.

The gastight elastic body preferably comprises a polymer elastic body including polyisobutylene represented by formula (1) or an ethylene propylene random copolymer represented by formula (2) as a main-chain skeleton.

where X and Y are polymerizable functional groups, m is an integer not less than 1, representing the repetition number of isobutylene oligomer.

where X and Y are polymerizable functional groups, and 1 and m are integers not less than 1.

As the conductive carbon particles, for example, natural graphite, artificial graphite, expanded graphite, and glassy carbon may be used. As the conductive carbon fine particles, carbon black such as acetylene black, ketjen black and mesophase carbon may be used.

Typical examples of the conductive micro-diameter carbon fibers are carbon nano-tubes.

Examples of the metallic filler are silver, copper, aluminum, iron, nickel, lead, tin, titanium, zinc, gold, and alloys thereof.

A preferred composition of the separator plates of the present invention comprises 20 to 45 wt % of binder, 50 to 74 wt % of conductive carbon particles, 0.5 to 10 wt % of conductive carbon fine particles and/or conductive micro-diameter carbon fibers.

In still another preferred embodiment, the composition further comprises 0.5 to 15 wt % of metallic filler.

A method for manufacturing a conductive separator plate for use in a polymer electrolyte fuel cell of the present invention comprises the steps of preparing molding pellets comprising the above-mentioned composition, and injection molding the pellets.

A molding die used here is preferably made from a material having a low thermal conductivity and a high hardness. As the material of the molding die, carbon tool steel (SK material) is generally used from the viewpoint of the molding tact and strength. When the molding material is injected into the die, the molten binder in the molding material is rapidly cooled and hardens upon contact with the die with a temperature not higher than the melting point thereof. Since normal injection molding materials have a low thermal conductivity, rapid cooling is necessary in order to increase the molding tact. Therefore, the temperature for holding the die is determined by the die filling performance and the molding tact.

The composition for the molding of the separator plates of the present invention has a high thermal conductivity. Hence, when the composition is injected into the die, its temperature rapidly decreases, the binder in the surface portion in contact with the die hardens, and the flow of the material is stopped. Consequently, the composition does not fill every nook and corner of the die, and a molding defect occurs. Therefore, a material having a low thermal conductivity is used as the material of the die and the dissipation of heat from the injected molten binder is delayed, thereby delaying the hardening of the binder in the portion in contact with the die and ensuring filling of the die with the molding material.

The composition for the molding of the separator plates of the present invention comprises a large amount of conductive filler including carbon particles so as to increase the conductivity. Therefore, the abrasion of the die increases. Accordingly, certain hardness is required.

Considering the above-mentioned facts, the present invention uses a material that satisfies both a low thermal conductivity and a high hardness. Materials having a thermal conductivity of not more than 26 W/m/K and a surface hardness HRC of not less than 35 at 100° C. are preferred. One of the preferred materials is stainless steel SUS630. Alternatively, it is possible to use a material obtained by coating the surface of carbon tool steel with a ceramic having a high hardness and a low thermal conductivity, such as alumina and zirconia. In one example of the method of coating alumina, aluminum is deposited on the surface of the base material, i.e., the carbon tool steel, in advance and partially diffused into the base material by heating at 500° C., and then oxidized in the air. Thus, an alumina layer closely bonded to the base material can be formed.

In the case where the material for the separator plate contains micro-diameter carbon fibers, if the ends of the carbon fibers are arranged to project from the surface of the separator plate, the electrical contact with the gas diffusion electrode is improved. In one method for manufacturing such a separator plate, the micro-diameter carbon fibers are deposited on the inner surface of the molding die together with a releasing agent, and the carbon fibers are transferred to the surface of the separator plate to be molded. In another method, the ends of the carbon fibers are exposed on the surface of the separator plate by burning off the surface portion of the molded separator plate by heating.

Next, the following description will explain in further detail a preferred embodiment of the present invention using a gastight elastic body as the binder.

A conductive gastight elastic body constituting a conductive separator plate is produced, for example, by mixing, as conductive materials, carbon nano-tubes as well as conductive carbon particles into an elastic body comprising a polymer represented by formula (1) or (2) as a base material. By adding a small amount of carbon nano-tubes as the conductive material, such a separator plate can have a sufficient conductivity even when the ratio of the conductive material in the separator plate is reduced to 75 wt % or less. Accordingly, the rigidity of the separator plate is improved, and cracks in the separator plate due to vibration can be significantly reduced.

Since the surface of the separator plate comprising the conductive gastight elastic body has flexibility and elasticity, even if the clamping load of cell stack is decreased, it is possible to significantly reduce the contact resistance between the separator plates and the electrodes and between the separator plates. In some cell structure, since the separator plates themselves have flexibility and elasticity, gaskets to be provided on the periphery of the electrodes are not particularly necessary, and the gas seal between the separator plates and the MEA can be directly provided by the surfaces of the separator plates. It is therefore possible to decrease the direct material cost and the manufacturing processes by a reduction in the number of component parts. Moreover, even when this separator plate is vibrated in the state where the cell stack pressure is being applied, it will never have cracks like carbon plates. Furthermore, by selecting a base material and a conductive material for the conductive gastight elastic body, the separator plate will never have corrosion under an acidic atmosphere, which occurs on metal separator plates.

It is also possible to add a vulcanizing agent having no sulfur components.

The present inventors looked for a base material that specifically satisfies the above-mentioned requirements, and found that a polymer elastic body comprising polyisobutylene represented by the formula (1) or an ethylene propylene random copolymer represented by the formula (2) as a main-chain skeleton is particularly suitable for the material of the separator plate having excellent gastightness, acid resistance and heat resistance.

The polymer elastic body comprising the formula (1) or (2) as a main-chain skeleton can realize an optimum elasticity for the separator plates of the polymer electrolyte fuel cell by selecting the degree of polymerization. A conductive material is mixed into the resin or polymer elastic body in a liquid state before polymerization, and the resultant mixture is molded into a sheet form and hardened by application of heat or an electron beam. Moreover, it is possible to form grooves for supplying fluids such as a fuel gas when molding the mixture into a sheet form. In this aspect, the processing steps during the manufacture of the separator plates can be significantly reduced compared to the conventional carbon plates and metal plates.

The polymer represented by the formula (1) shown above is such one as made in a manner that isobutylene oligomers each, as one unit, having a repetition number m and having terminal functional groups X and Y added thereto are cross-linked at the terminal functional groups. When allyl groups, acryloyl groups, methacryloyl groups, isocyanate groups, or epoxy groups are used as X and Y, and these functional groups are made crosslink points, post-polymerization polymers are cross-linked in a matrix form to have a network structure as these functional groups are polyfunctional groups. The physical properties of the polymers are largely affected by the repetition number m of isobutylene oligomer in the stage of raw material, contained in the polymer material represented by the formula (1), the final polymerization degree, and the kinds of the terminal functional groups.

According to the results of examination by the present inventors, when this material is used for the material of the conductive separator plates of the polymer electrolyte fuel cell, the repetition number m of isobutylene oligomer in the stage of raw material is preferably between 56 and 72, and 64 on average, while the final polymerization degree is preferably 8000 or more. In addition, the ratio of the content of the terminal functional groups X and Y is preferably as small as possible from the viewpoint of stability and acid resistance.

As the terminal functional groups X and Y in the ethylene propylene random copolymer represented by the formula (2) above, diene groups, triene groups, diolefine groups, polyalkenyl cycloalkane groups, norbornene derivatives, acryloyl groups, methacryloyl groups, isocyanate groups, epoxy groups, or the like are used, and the material can be hardened by a suitable polymerization reaction. When the terminal functional groups are diene groups, acryloyl groups or methacryloyl groups, the material can be hardened by electron beam irradiation. When the terminal functional groups are isocyanate groups, the material can be hardened by urethane bonding with the aid of water. When the terminal functional groups are epoxy groups, the material can be hardened by heating using a known amine based hardener such as ethyl diamine. The physical properties of the polymer are affected by l and m in the formula (2), the overall polymerization degree l+m, and the terminal functional groups. It is preferred that l is not more than 1000, m is not more than 19000, and l+m is between 5000 and 20000.

As the conductive material to be mixed into the polymer elastic body that is the base material comprising the polyisobutylene represented by the formula (1) or the ethylene propylene random copolymer represented by the formula (2) as the main-chain skeleton, various kinds of conductive carbon powders and fibers as well as carbon nano-tubes are suitably used. These conductive materials preferably contain carbon particles with an average particle diameter of 10 to 200 μm. By containing large carbon particles with an average particle diameter of 10 μm or more, the contact resistance between the carbon particles can be reduced. Besides, large particles exceeding 200 μm are not preferred because the flowability of the carbon particles deteriorates during molding. 50 to 100 μm particles are most preferred. An appropriate ratio of the content of the conductive material in a conductive polymer elastic body obtained by mixing the conductive material is 55 to 75 wt %, and an appropriate ratio of the carbon nano-tubes in the conductive material is 2 to 50 wt %. When the ratio of the carbon nano-tubes is less than 2 wt %, the contact between the carbon nano-tubes is not sufficient, and therefore the effect of improving the conductivity is small. Moreover, since the carbon nano-tubes are expensive, it is disadvantages to use the carbon nano-tubes in an amount exceeding 50 wt %.

A preferred composition for molding the separator plates of the present invention comprises a binder, conductive carbon particles with a diameter of 50 to 200 μm, and carbon nano-tubes. When pellets or particulate matter prepared from this composition are injection molded, the conductive carbon particles are stacked in layers with high density, and the carbon nano-tubes are present at random around the conductive carbon particles. In general, the volume resistivity of the separator plate tends to increase as the number of layers of the conductive carbon particles increases. By increasing the average particle diameter of the conductive carbon particles, it is possible to reduce the number of the layers. However, since the number of contact points between the carbon particles is also reduced, a significant effect can not be expected in reducing the volume resistivity. In the present invention, since the carbon nano-tube is present between the conductive carbon particles, the number of contact points between the carbon particles increases, and the volume resistivity is significantly decreased. Besides, when the composition containing such large carbon particles and carbon nano-tubes in the form of short fibers is injection molded, the carbon particles and the carbon nano-tubes collide with each other when injected, and the direction of the major axis of the carbon nano-tubes tends to be random. Therefore, the anisotropy of the resistance which occurs due to the orientation of the carbon fibers can be solved, and excellent electric conductivity can be obtained in both the plane direction and thickness direction of the separator plates.

The following description will explain an embodiment of the present invention with reference to the drawings.

Figure 1:
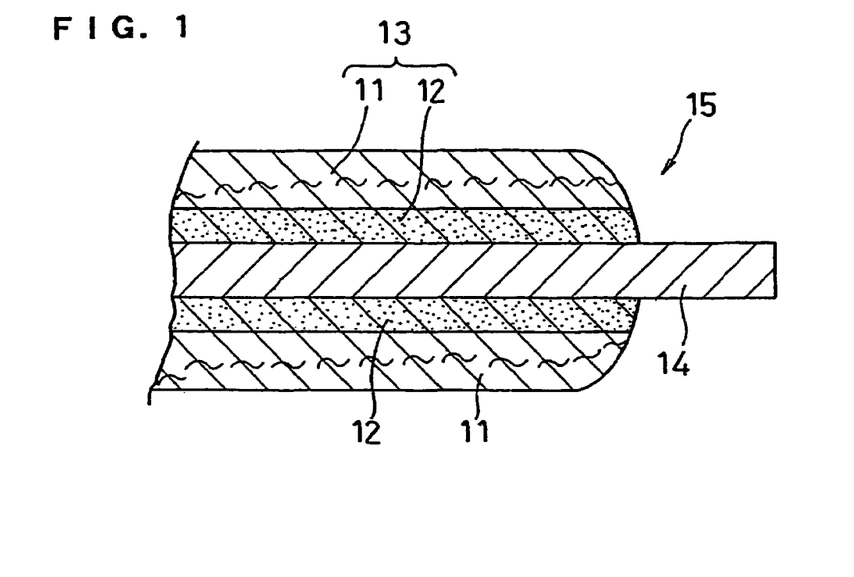
FIG. 1 is a vertical cross sectional view showing an essential part of an MEA used in a fuel cell of one example of the present invention.

FIG. 1 is a vertical cross sectional view of the essential part, showing the structure of an MEA. 11 is a gas diffusion layer made of carbon paper, 12 is a catalyst layer formed on one surface of the gas diffusion layer 11, and the combination of the gas diffusion layer 11 and the catalyst layer 12 is called an electrode 13. By sandwiching a polymer electrolyte membrane 14 between a pair of the electrodes, an MEA 15 is constructed.

Figure 2:
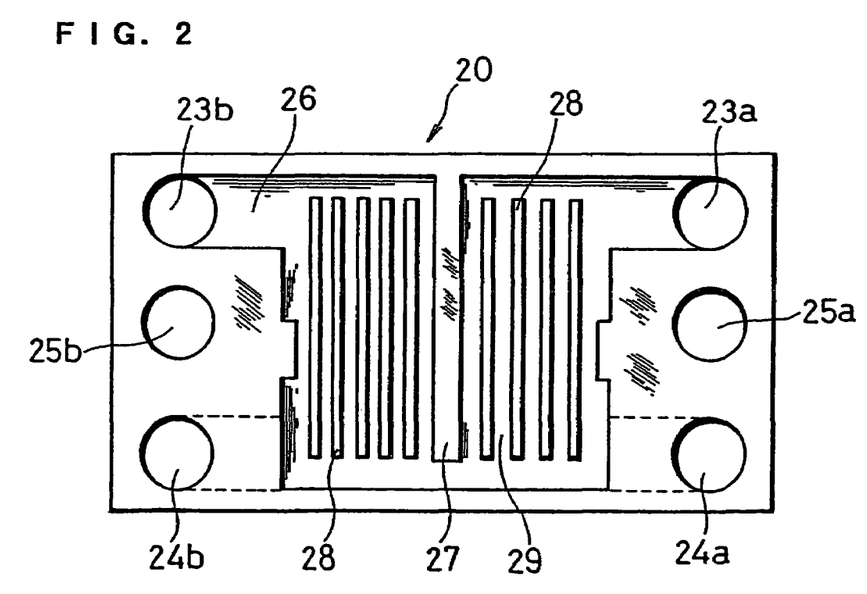
FIG. 2 is a cathode-side front view of a separator plate used in the fuel cell of the same example.
Figure 3:
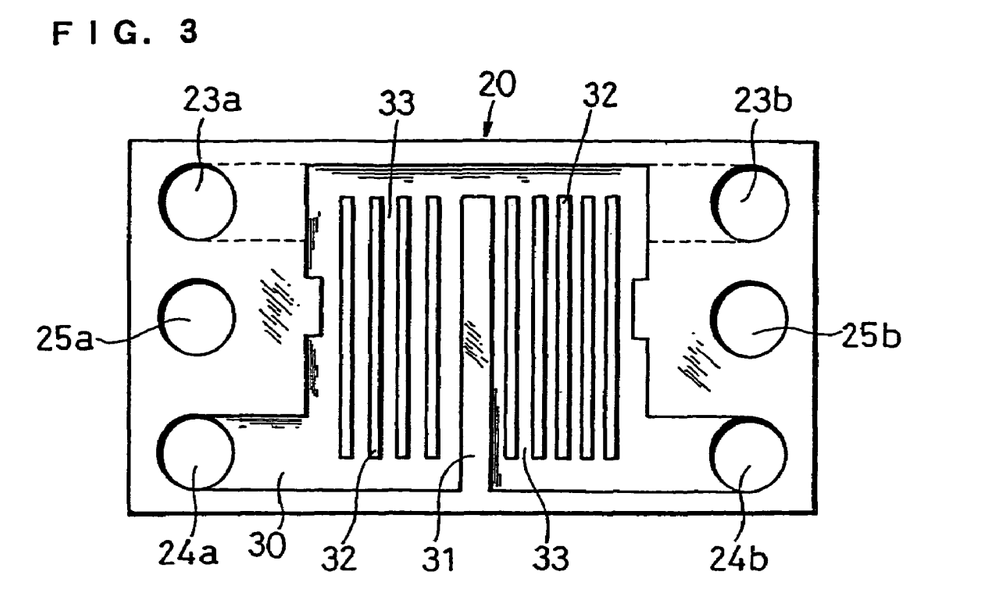
FIG. 3 is an anode-side front view of the separator plate.

FIG. 2 is a front view of a conductive separator plate, seen from the cathode side, and FIG. 3 is a rear view thereof, i.e. a front view seen from the anode side. This conductive separator plate 20 serves as a cathode-side conductive separator plate and an anode-side conductive separator plate. The conductive separator plate 20 has, on one end thereof, an inlet-side manifold aperture 23a for an oxidant gas, an inlet-side manifold aperture 24a for a fuel gas, and an inlet-side manifold aperture 25a for cooling water, and has, on the other end thereof, an outlet-side manifold aperture 23b for the oxidant gas, an inlet-side manifold aperture 24b for the fuel gas, and an outlet-side manifold aperture 25b for the cooling water. The separator plate 20 has a groove 26 formed to run from the manifold aperture 23a to 23b on a surface thereof facing the cathode. Provided in the groove are a rib 27 for parting the separator plate 20 in the middle, and a group of ribs 28 for forming a plurality of parallel gas flow channels 29.

On the other hand, the separator plate 20 has a groove 30 formed to run from the manifold aperture 24a to 24b on a surface thereof facing the anode. Provided in the groove are a rib 31 for parting the separator plate 20 in the middle, and a group of ribs 32 for forming a plurality of parallel gas flow channels 33.

The conductive separator plate 20 illustrated here is to be inserted between unit cells, and the cathode-side separator plate positioned on one end of a cell stack, which is obtained by stacking a plurality of unit cells, has gas flow channels as shown in FIG. 2 on one surface thereof, but has a plane surface on the other surface. Besides, the anode-side separator plate positioned on the other end of the cell stack has gas flow channels as shown in FIG. 3 on one surface thereof, but has a plane surface on the other surface.

Figure 4:
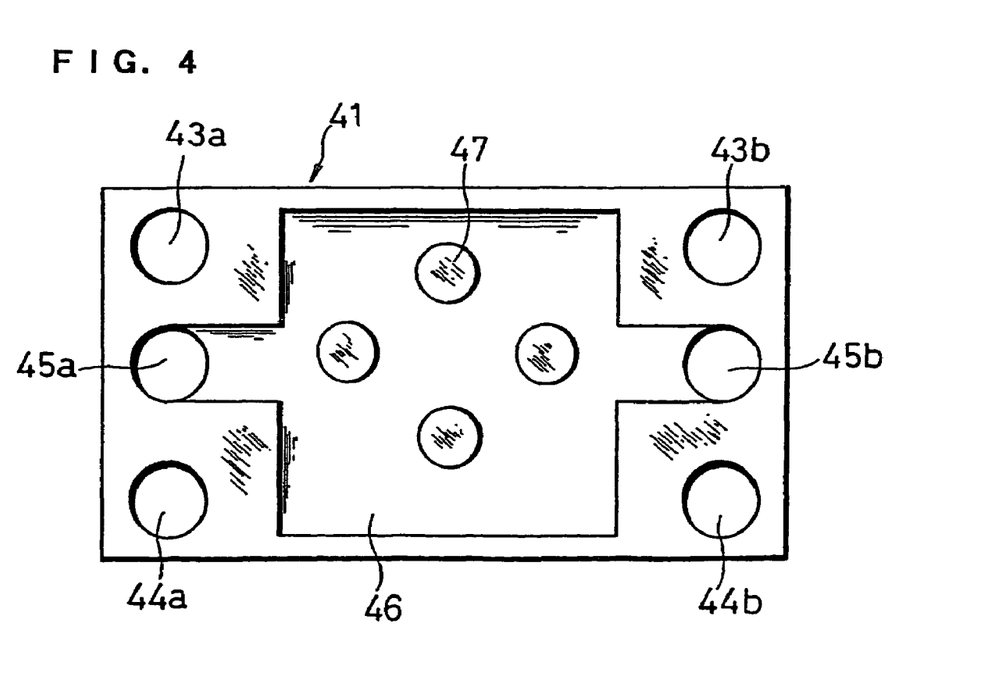
FIG. 4 is a cooling water-side front view of another separator plate used in the fuel cell of the same example.

FIG. 4 is a front view of a surface of a conductive separator plate, having a cooling water flow channel. Like the separator plate 20, this conductive separator plate 41 has, on one end thereof, an inlet-side manifold aperture 43a for the oxidant gas, an inlet-side manifold aperture 44a for the fuel gas, and an inlet-side manifold aperture 45a for the cooling water, and has, on the other end thereof, an outlet-side manifold aperture 43b for the oxidant gas, an inlet-side manifold aperture 44b for the fuel gas, and an outlet-side manifold aperture 45b for the cooling water. The separator plate 41 has, on one surface thereof, a groove 46 running from the manifold aperture 45a to 45b to form the cooling water flow channel, and a plurality of circular ribs 47 provided in the groove 47.

A pair of the conductive separator plates 41 is joined together so that their surfaces having the cooling water flow channels 46 face each other, so that a cooling section for passing the cooling water is formed between them. Moreover, like FIG. 2, an oxidant gas flow channel running from the inlet-side manifold aperture 43a to the manifold aperture 43b is formed on the rear surface of one of the separator plates, while, like FIG. 3, a fuel gas flow channel running from the inlet-side manifold aperture 44a to the manifold aperture 44b is formed on the rear surface of the other separator plate.

Figure 5:
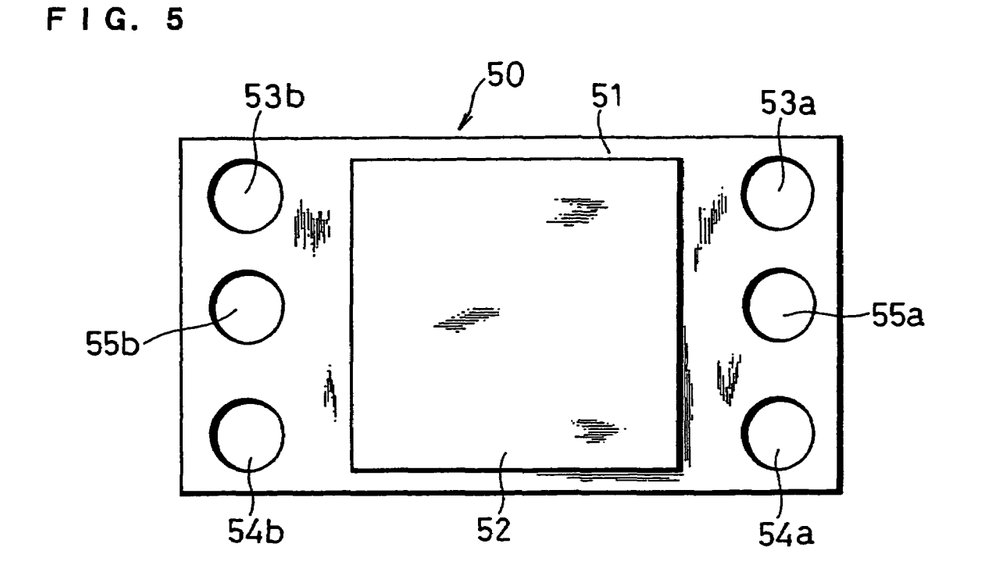
FIG. 5 is an anode-side front view of the MEA used in the fuel cell of the same example.

FIG. 5 is a front view of an MEA. The MEA 50 comprises a polymer electrolyte membrane 51, and electrodes 52 sandwiching the polymer electrolyte membrane 51 therebetween. The polymer electrolyte membrane 51 has, on one end thereof, an inlet-side manifold aperture 53a for the oxidant gas, an inlet-side manifold aperture 54a for the fuel gas, and an inlet-side manifold aperture 55a for the cooling water, and has, on the other end thereof, an outlet-side manifold aperture 53b for the oxidant gas, an outlet-side manifold aperture 54b for the fuel gas, and an outlet-side manifold aperture 55b for the cooling water.

In the examples illustrated below, 50 cells were stacked by stacking the MEAs 50 shown in FIG. 5 with the separator plate 20 therebetween and inserting a pair of separator plates 41 for forming the cooling section every two cells.

The following description will explain some examples of the present invention with reference to the drawings.

EXAMPLE 1

First, an electrode catalyst was prepared by causing a carbon black powder to carry platinum particles with an average particle diameter of 30 Å in a weight ratio of 50:50. A dispersion of a perfluorocarbon sulfonic acid represented by the formula (3) in an ethyl alcohol was mixed with a dispersion of this catalyst powder in isopropanaol so as to form a catalyst paste.

(3)

where m=1, n=2, 5≦x≦13.5, y≈1000.

Meanwhile, a water repellent treatment was applied to a carbon paper to be a supporting body for the electrode. After soaking a carbon nonwoven fabric with outer dimensions of 8 cm×10 cm and a thickness of 360 μm (TGP-H-120 manufactured by Toray Industries Inc.) in an aqueous dispersion of fluorocarbon resin (Neoflon ND1 manufactured by DAIKIN INDUSTRIES, LTD.), the carbon nonwoven fabric was dried and heated for 30 minutes at 400° C. to impart water repellency. By applying the catalyst paste to one surface of this carbon nonwoven fabric by a screen printing method, a catalyst layer was formed. A part of the catalyst layer is buried in the carbon nonwoven fabric. In this manner, the electrode composed of the catalyst layer and the carbon nonwoven fabric was produced. Adjustments were made so that the amounts of platinum and perfluorocarbon sulfonic acid contained in the electrode were both 0.3 mg/cm².

Next, a pair of the electrodes was joined to the front and rear surfaces of a hydrogen ion conductive polymer electrolyte membrane with outer dimensions of 10 cm×20 cm by hot pressing so that the catalyst layers came into contact with the electrolyte membrane. This is called an electrolyte membrane-electrolyte assembly (MEA). Here, as the hydrogen ion conductive polymer electrolyte membrane, a 30 μm-thick thin film of perfluorocarbon sulfonic acid represented by the formula (3)(where m=1, n=2, 5≦x≦13.5, y≈1000) was used.

Next, the following description will explain a conductive separator plate comprising a conductive gastight elastic body having an acid resistance.

A liquid raw material represented by the formula (1), where the repetition number m of isobutylene oligomer is 56 to 72, 64 on average, and the functional groups X and Y are both isoprene, was prepared. 100 g of the liquid raw material was mixed with conductive materials of 15 g of carbon nanotubes, 100 g of a graphite powder with an average particle diameter of 80 μm, 50 g of a graphite powder with an average particle diameter of 1 μm or less, and 50 g of fibrous graphite (with an average diameter of 50 μm and an average length of 0.5 mm), and 200 g of methyl ethyl ketone was added to the mixture for viscosity adjustment. The mixture was mixed sufficiently to prepare a formulated concentrate for the separator plate. This formulated concentrate was poured into a die made of stainless steel and kept at 50° C. under a reduced pressure of an atmospheric pressure of 0.2 for one hour so as to volatilize the methyl ethyl ketone. Next, an acceleration voltage of 500 keV and an electron beam with an exposure of 50 Mrad were applied to the mixture so as to polymerize the isoprene in the ends of the isobutylene oligomer, thereby producing the conductive separator plate. The degree of polymerization was about 10000.

When the repetition number m of isobutylene oligomer of the raw material was made smaller than 56, the resultant sheet after polymerization was hard, and it was therefore necessary to increase the clamping pressure in assembling the cell in order to lower the contact resistance with the MEA. On the other hand, when m was made larger than 72, the sheet became too soft and the grooves of gas flow channel on the surface of separator plate were squashed by the clamping pressure during the assembly of the cell. The influence by the degree of polymerization was examined by controlling the exposure of the electron beam to the raw material. As a result, when the degree of polymerization was smaller than 5000, the resultant sheet was too soft and the grooves of gas flow channel were squashed like the above.

Besides, it was confirmed that one obtained by using allyl groups, acryloyl groups, methacryloyl groups, isocyanate groups, or epoxy groups other than isoprene as the terminal functional groups and hardening the material by a suitable polymerization reaction can be used in the same manner. Note that, when acryloyl groups or methacryloyl groups were used as the terminal functional groups, the material was hardened by electron beam irradiation like the above; when isocyanate groups were used, the material was hardened by urethane bonding with the aid of water; or when epoxy groups were used, the material was hardened by heating using a known amine-based hardener such as ethyl diamine. In these cases, like the case where the functional groups are allyl groups, when the repetition number m of isobutylene oligomer in the raw material stage, contained in the structure represented by the formula (1), was 56 to 72 and the final polymerization degree was 8000 or more, a suitable material for the separator plate was obtained.

In the manner described above, the conductive separator plate 20 and the conductive separator plates 41 forming the cooling section shown in FIGS. 2 through 4 were produced. During the production of the separator plate, the die made of stainless steel was processed so as to enable the formation of the gas flow channel grooves and manifold apertures in the separator plates, and therefore it is not necessary to perform post-processing, such as cutting and press punching, after removing the separator plate from the die.

The conductive separator plate has a size of 10 cm×20 cm and a thickness of 2 mm. The grooves 29 and 33 of the separator plate 20 have a width of 2 mm and a depth of 0.7 mm, and each of the ribs 28 and 33 between the grooves has a width of 1 mm. The depth of the groove 46 of the separator plates 41 is 0.7 mm. Besides, this example employed a gas sealing method in which the outer peripheral edge of the separator plate and the peripheral edges of the manifold apertures (except portions connected with the gas flow channels) were made higher than the electrode contact surface, i.e., the top faces of the ribs 28 and 32, by 0.3 mm, and the polymer electrolyte membrane was sandwiched between the heightened portions. Therefore, in the cell of this example, a gasket was not provided on the periphery of the electrode on the MEA side.

With the use of the above-described MEA and separator plates, a cell stack was assembled by stacking 50 cells. On both ends of the cell stack, current collector plates of stainless steel, insulating plates and end plates were stacked and fixed with clamping rods. The clamping pressure per area of the separator plate was 3 kgf/cm$^2$. Compared to a fuel cell using conventional carbon separator plates that requires a high clamping pressure of about 20 kgf/cm$^2$, predetermined characteristics were obtained with a small pressure according to the present invention. However, when a pressure smaller than this pressure was used, gas leakage occurred, the contact resistance increased, and the cell performance deteriorated. On the other hand, when the cell stack was clamped too tightly, the protruding parts of the separator plates were squashed and the flow of gases and cooling water was impaired, and consequently the cell performance also deteriorated. In other words, it was important to adjust the clamping pressure by the elasticity of the conductive separator plates.

The polymer electrolyte fuel cell of this example thus produced was held at 80° C., and a hydrogen gas humidified and heated to a dew point of 80° C. was supplied to the anode, while the air humidified and heated to a dew point of 70° C. was supplied to the cathode. As a result, an open circuit voltage of 50 V was obtained during no load at which a current is not output to the outside.

Figure 6:
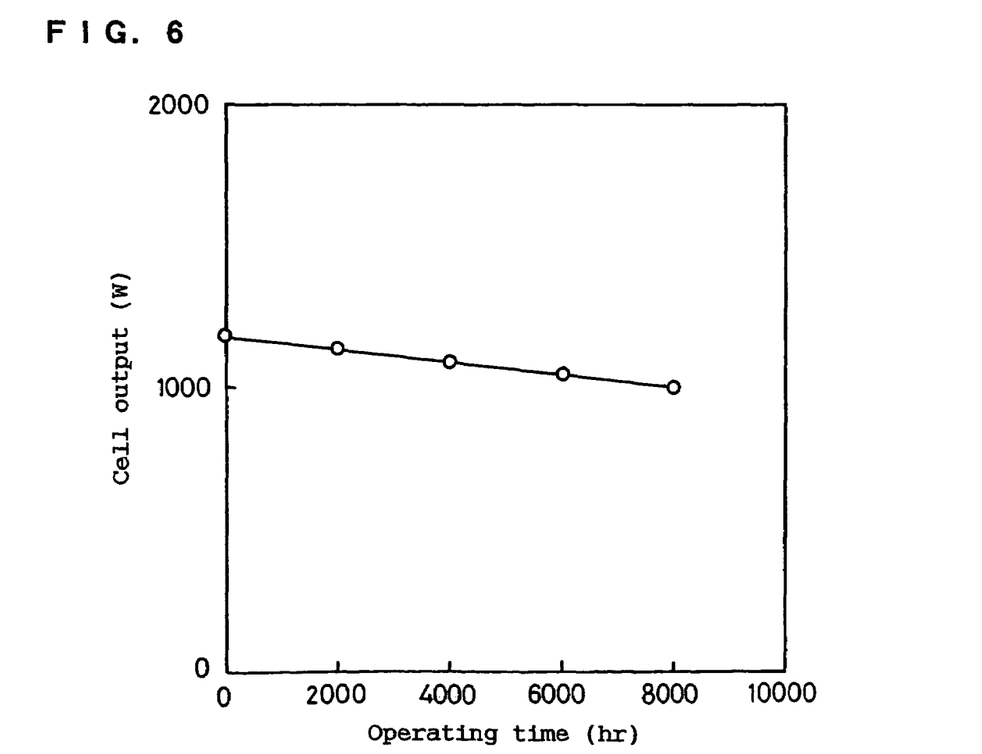
FIG. 6 is a view showing a change in the output characteristics of a fuel cell of Example 1 with time.

FIG. 16 shows the change in the output characteristics with time when a continuous power generation test was performed under the condition that the fuel gas utilization ratio was 80%, the oxygen utilization ratio was 50% and the current density was 0.5 A/cm$^2$. As a result, it was confirmed that the cell of this example maintained a cell output of 1000 W (22 V-45 A) over 8000 hours.

Additionally, since the cell of this example was constructed by sandwiching the electrode sheet between the separator plates having elasticity, it was particularly strong against vibration and impact. When a cell composed of conventional carbon separator plates was dropped from a height of 2 m, the separator plates cracked after about one drop, while the cell of this example did not have unrecoverable damage, except that the rod in the clamped section was loosened, even after performing the drop test 100 times.

EXAMPLE 2

In the above-mentioned example, while the material including polyisobutylene as a main-chain skeleton was used as the conductive gastight elastic body for producing the separator plates, Example 2 used a material prepared by mixing a conductive material into a base material that is a polymer elastic body including an ethylene propylene random copolymer represented by the formula (2) as a main-chain skeleton.

A liquid oligomer including the ethylene propylene random copolymer represented by the formula (2), where the terminal groups X and Y were diene groups, the copolymerization ratio was l:m=1:1, and l+m was about 60, was prepared. 20 g of carbon nano-tubes, 100 g of a graphite powder with an average particle diameter of 70 μm, 50 g of a carbon black powder, and 30 g of fibrous graphite (with an average diameter of 50 μm and an average length of 0.5 mm) were sufficiently mixed into 100 g of the prepared liquid oligomer so as to produce a formulated concentrate for the separator plate. This formulated concentrate was injection molded in a die made of stainless steel kept at 160° C., and then held for 10 minutes for vulcanization, thereby producing the conductive separator plate. The degree of polymerization l+m was about 7000.

Note that, when the degree of polymerization was made larger than 20000, the resultant sheet was too hard, and it was therefore necessary to increase the clamping pressure in assembling the cell in order to lower the contact resistance with the MEA. On the other hand, when the degree of polymerization was made smaller than 4000, the sheet became too soft and the grooves of gas flow channel on the surface of separator plate were squashed with the clamping pressure during the assembly of the cell. Furthermore, the influence of the degree of polymerization was examined by controlling the exposure of the electron beam, and consequently it was found that, when the degree of polymerization was smaller than 5000, the resultant sheet was too soft and the grooves of gas flow channel were squashed like the above.

In addition, it was confirmed that materials which have triene groups, diolefine groups, polyalkenyl cycloalkane groups, nobornene derivatives, acryloyl groups, methacryloyl groups, isocyanate groups, or epoxy groups as the terminal functional groups in place of the diene groups and hardened by a suitable polymerization reaction can be used in the same manner. Note that, when the acryloyl groups or methacryloyl groups were used as the terminal functional groups, the material was hardened by electron beam irradiation like the above; when the isocyanate groups were used, the material was hardened by urethane bonding with the aid of water; or when the epoxy groups were used, the material was hardened by heating using a known amine-based hardener such as ethyl diamine.

With the use of the above-mentioned separator plates, a cell similar to Example 1 was assembled, and the characteristics thereof were evaluated under the same conditions as in Example 1. As a result, it was confirmed that the cell had the characteristics as good as those of the cell of Example 1. Moreover, the cell had excellent vibration resistance and impact resistance like the cell of Example 1.

EXAMPLE 3

As the electrode catalyst for forming the catalyst layer, one comprising an acetylene black powder carrying platinum particles with an average particle diameter of about 30 Å in a weight ratio of 75:25 was used. The electrolyte membrane had a film thickness of 50 μm, and the amounts of platinum and perfluorocarbon sulfonic acid contained in the catalyst layer were 0.5 mg/cm$^2$ and 1.2 mg/cm$^2$, respectively. Except for the above-mentioned conditions, the MEA was produced in the same manner as in Example 1.

Next, the conductive separator plates were produced as follows. Pellets for the separator plates were produced by sufficiently heating and kneading 20 g of polyphenylene sulfide as a binder, 75 g of conductive carbon particles with an average particle diameter of 50 to 200 μm, and 5 g of carbon nano-tubes with a fiber diameter of 10 nm to 30 nm and a fiber length of 1 to 10 μm. The pellets were put into an injection molding machine, and injection molded in a predetermined die to produce the conductive separator plate. The injection pressure was 1600 kgf/cm$^2$, the die temperature was 150° C., and the molding time was 20 seconds.

In the above-described method, the conductive separator plates 20 and 41 shown in FIGS. 2 through 4 were produced. The conductive separator plates have a size of 10 cm×20 cm and a thickness of 4 mm. The grooves 29 and 33 of the separator plate 20 have a width of 2 mm and a depth of 1.5 mm, and each of the ribs 28 and 32 between the grooves has a width of 1 mm. The depth of the grooves 46 of the separator plates 41 is 1.5 mm.

Table 1 shows the results of measuring the volume resistivity of the resultant separator plates. Compared to a separator plate produced from a composition containing no carbon nano-tubes, the volume resistivity of the separator plates of this example was reduced to 1/100 or less, and was not higher than 20 mŪ·cm.

TABLE 1

|  |  | No. | |
|---|---|---|---|
|  |  | 1-1 | 1-2 |
| Composition (wt %) | Binder | 20 | 20 |
|  | Carbon particles | 80 | 75 |
|  | Carbon nano-tubes | 0 | 5 |
| Volume specific resistance (mŪ · cm) | | 2060 | 20 |

With the use of the above-described MEA and separator plates, a cell stack was assembled by stacking 50 cells in the same manner as in Example 1. However, the clamping force of the cell stack per area of the separator plate was 10 kgf/cm$^2$.

The polymer electrolyte fuel cell of this example thus produced was held at 85° C., and a hydrogen gas humidified and heated to a dew point of 83° C. was supplied to the anode, while the air humidified and heated to a dew point of 78° C. was supplied to the cathode. As a result, an open circuit voltage of 50 V was obtained during no load at which a current is not output to the outside.

Figure 7:
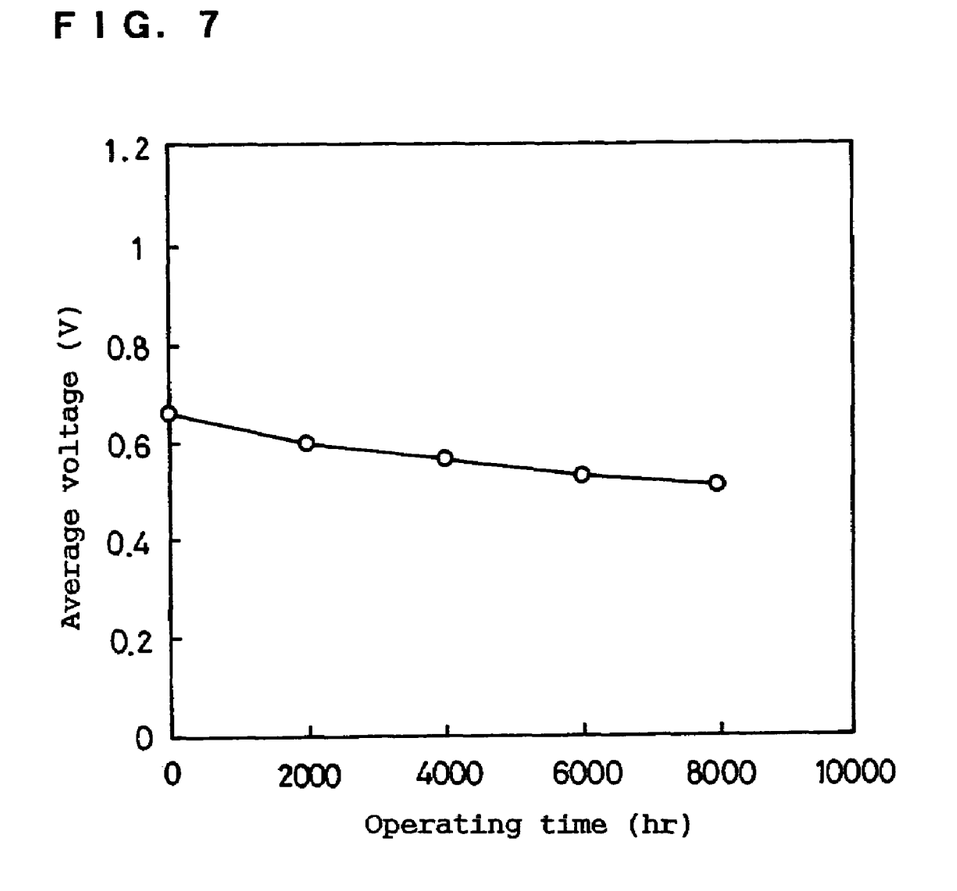
FIG. 7 is a view showing a change in the output voltage of a fuel cell of Example 3 with time.

A continuous power generation test was performed under the conditions that the fuel gas utilization ratio was 80%, the oxygen utilization ratio was 40% and the current density was 0.5 A/cm$^2$. The change in the output voltage with time is shown in FIG. 7. It was confirmed that the cell of this example maintained a cell output not lower than 0.5 V in average voltage over 8000 hours.

EXAMPLE 4

With the use of seven kinds of compositions containing the binder and carbon nano-tubes in different amounts, separator plates were injection molded under the same conditions as in Example 3. The moldability and volume resistivity of the separator plates are shown in Table 2.

TABLE 2

|  |  | No. | | | | | | | |
|---|---|---|---|---|---|---|---|---|---|
|  |  | 2-1 | 2-2 | 2-3 | 2-4 | 2-5 | 2-6 | 2-7 | 2-8 |
| Composition (wt %) | Binder | 15 | 25 | 35 | 25 | 25 | 25 | 25 | 45 |
|  | Carbon particles | 80 | 70 | 60 | 70 | 74.5 | 65 | 55 | 50 |
|  | Carbon nano-tubes | 5 | 5 | 5 | 0 | 0.5 | 10 | 20 | 5 |
|  | Carbon fibers (60-70 μm) | 0 | 0 | 0 | 5 | 0 | 0 | 0 | 0 |
| Volume specific resistance (mŪ · cm) | | — | 22 | 70 | — | 30 | 18 | 18 | 500 |
| Moldability | | X | ◎ | ◎ | X | ◎ | ○ | Δ | ◎ |

When the amount of the binder was less than 20 wt %, the flowability during injection deteriorated extremely, and injection molding was difficult. When the amount of the binder exceeded 40 wt %, the moldability was improved, but the volume resistivity of the molded separator plate deteriorated extremely. When the amount of carbon nano-tubes was within a range of 0.5 wt % to 10 wt %, a reduction in the volume resistivity of the resultant separator plates was significant. However, even when the amount of carbon nano-tubes was increased to 10 wt % or more, the effect of reducing the volume resistivity was small. When other carbon fibers (with a fiber length of 60 to 70 μm) were mixed instead of the carbon nano-tubes, the flowability of the composition deteriorated extremely, and injection molding was difficult.

Based on the results, as a preferred composition, molding pellets were produced by sufficiently heating and kneading 25 wt % of polyphenylene sulfide as a binder, 70 wt % of conductive carbon particles with an average particle diameter of 50 to 200 μm, and 5 wt % of carbon nano-tubes with a fiber diameter of 10 to 30 nm and a fiber length of 1 to 10 μm. The pellets were charged into the injection molding machine, and injection molded in the predetermined die to produce the conductive separator plate. The injection pressure was 1600 kgf/cm$^2$, the die temperature was 150° C., and the molding time was 20 seconds.

With the use of the separator plates thus produced, a cell stack was assembled in the same manner as in Example 3, and the characteristics thereof were evaluated under the same conditions as in Example 3. As a result, it was confirmed that the cell of Example 4 had the characteristics as good as those of the cell of Example 3. Moreover, the separator plates of Example 4 had superior toughness, abrasion resistance and impact resistance compared to the separator plates of Example 3.

EXAMPLE 5

In this example, the molding pellets of Example 4 were used, but a fluorine-based releasing agent and carbon nano-tubes were applied to the surface of the die for injection molding in advance. The carbon nano-tubes transferred from the die were bonded to the surface of the separator plate molded under the same conditions as in Example 4, and the most part of the carbon nano-tubes protruded from the surface of the carbon separator plate. With the use of such a separator plate, it is possible to increase the contact point between the separator plate and the gas diffusion layer, thereby significantly reducing the contact resistance. Moreover, by treating the surface of a separator plate that was produced by ordinary injection molding, at about 500° C. to remove the resin layer from the surface, the carbon nano-tubes protrude from the surface of the separator plate in the same manner, and the effect of reducing the contact resistance is obtained. The separator plates according to Example 5 had superior toughness, abrasion resistance and impact resistance compared to the separator plates of Example 3.

EXAMPLE 6

In this example, molding pellets comprising compositions containing various kinds of conductive carbon particles having different length/width and metallic filler were produced, and separator plates were produced by injection molding the molding pellets. The injection pressure was 1000 kgf/cm², the die temperature was 150° C., and the molding time was 20 seconds. The molded separator plates were immersed in a 3% hydrochloric acid aqueous solution for two hours, and then washed with water and dried to remove the silver powder exposed on the surfaces. When the cross sections of the separator plates were observed, the silver powder was present between the carbon particles in the separator plates, and the silver powder particles were not continuously connected to each other. Further, it was confirmed that only the silver powder exposed on the surfaces had been removed.

Table 3 shows the volume resistivity of the separator plates produced as described above and the moldability. With the addition of the metallic filler, even when the amount of the binder was increased, the separator plates had similar volume resistivity, and improved moldability compared to the separator plates containing no metallic filler. It is thus clear that the addition of metallic filler has an advantageous effect. With the use of a filler comprising conductive carbon particles or silver powder whose width exceeds 200 μm, the material has a filling defect in the thinnest portion of the molded separator plate. Therefore, there are problems in the moldability and the gas permeability of the resultant separator plate. For example, in the separator plate shown in FIGS. 2 and 3, the thinnest portion is a portion having the gas flow channel 29 on one surface and the gas flow channel 33 on the other surface. The thickness of the thinnest portion is 0.6 mm in the separator plate of Example 1, and 1.0 mm in the separator plate of Example 3. It was thus found that the diameter of the filler should preferably be set to a value which is not greater than ⅓ of the thinnest portion of the separator plate and not greater than about 200 μm.

TABLE 3

| Composition (wt %) | | | 3-1 | 3-2 | 3-3 | 3-4 | 3-5 | 3-6 | 3-7 | 3-8 | 3-9 | 3-10 |
|---|---|---|---|---|---|---|---|---|---|---|---|---|
| | Binder | | 30 | 30 | 30 | 30 | 30 | 40 | 40 | 40 | 40 | 40 |
| | Carbon particle length/width (μm) | 100/100 | 70 | | | | | | | | | |
| | | 200/100 | | 70 | | | | 50 | 50 | 50 | 50 | 50 |
| | | 300/100 | | | 70 | | | | | | | |
| | | 400/200 | | | | 70 | | | | | | |
| | | 500/250 | | | | | 70 | | | | | |
| | Silver powder length/width (μm) | 50/50 | | | | | | 10 | | | | |
| | | 100/50 | | | | | | | 10 | | | |
| | | 200/50 | | | | | | | | 10 | | |
| | | 400/200 | | | | | | | | | 10 | |
| | | 500/250 | | | | | | | | | | 10 |
| Volume specific resistance (mΩ·cm) | | | 100 | 30 | 25 | 25 | 25 | 50 | 30 | 30 | 30 | 30 |
| Moldability | | | ○ | ○ | ○ | ○ | X | ◎ | ◎ | ◎ | ◎ | X |

EXAMPLE 7

In this example, molding pellets comprising compositions containing various kinds of conductive carbon particles having different particle size distribution and conductive carbon fine particles were prepared, and separator plates were produced by injection molding the molding pellets under the same conditions as in Example 6. Table 4 shows the moldability and the volume resistivity of the resultant separator plates.

When the peak of the particle size distribution of the conductive carbon particles exceeded an average diameter of 200 μm, a molding defect occurs in the thinnest portion of the separator plate, and consequently there arises a problem of gas permeability. When the peak of the particle size distribution of the conductive carbon particles is less than an average diameter of 50 μm, the volume resistivity deteriorates. However, it was found that it is possible to significantly lower the volume resistivity by mixing carbon fine particles that have the peak of the particle size distribution at an average diameter of 30 to 100 nm with carbon particles having the peak of the particle size distribution at an average diameter of 50 to 200 nm. The fine particles used here were ketjen black manufactured by LION CORPORATION.

According to the results, an example of the preferred composition of molding pellets comprises 40 wt % of polyphenylene sulfide as the binder, 50 wt % of conductive carbon particles with an average diameter of 50 to 200 μm, 6 wt % of silver powder with a length of 100 to 250 μm and a width not more than 50 μm, and 4 wt % of ketchen black (manufactured by LION CORPORATION.).

EXAMPLE 8

In this example, molding pellets comprising compositions containing conductive carbon particles having a preferred particle size distribution were produced, and separator plates were molded under the same conditions as in Example 6. Table 5 shows the moldability and the volume resistivity of the resultant separator plates.

When the amount of the binder was less than 20 wt %, the flowability during injection deteriorated extremely, and injection molding was difficult. When the amount of the binder was 45 wt % or more, the moldability improved, but the volume resistivity of the resultant separator plates deteriorated extremely. Further, when 0.5 to 15 wt % of metallic filler was mixed, a significant reduction in the volume resistivity was observed. However, even when the amount of the metallic filler was increased to 15 wt % or more, the effect does not change. In order to reduce the influence of outflow of metal ions, it is preferable to set the upper limit of the silver powder to 15 wt %. When 0.5 to 10 wt % of conductive carbon fine particles with an average diameter of 30 to 100 µm were mixed, a significant reduction in the volume resistivity was observed. However, even when the amount of the carbon fine particles was increased to 10 wt % or more, the effect does not change. Since the carbon fine particles have a small bulk density, it is difficult to evenly disperse and mix the carbon fine particles. It is therefore preferable to set the upper limit of the carbon fine particle to 10 wt %.

According to the results, an example of the preferred composition of molding pellets comprises 40 wt % of polyphenylene sulfide as the binder, 50 wt % of conductive carbon particles with an average particle diameter of 50 to 200 µm, 4 wt % of conductive carbon fine particles with an average diameter of 30 to 100 µm, and 6 wt % of silver powder as the metallic filler.

The molded separator plates were immersed in a 3% hydrochloric acid aqueous solution for two hours, and then washed with water and dried to remove the silver powder exposed on the surfaces thereof.

Fuel cells were assembled using the separator plates produced from the pellets having the preferred compositions of Examples 7 and 8. These fuel cells similar to that of Example 3 exhibited substantially the same characteristics as the fuel cell of Example 3, under the same conditions.

INDUSTRIAL APPLICABILITY

According to the present invention, it is possible to produce separator plates by injection molding a composition containing a binder composed of a thermoplastic resin, instead of a conventional technique of cutting carbon plates, thereby achieving a significant reduction in the cost. Moreover, it is possible to minimize the increase in the volume resistivity. Furthermore, the separator plates have toughness, abrasion resistance and impact resistance, and contribute to an improvement in the yield of the assembly of fuel cells.

The invention claimed is:

1. A polymer electrolyte fuel cell comprising:
    a hydrogen ion conductive polymer electrolyte membrane;
    a pair of electrodes sandwiching said hydrogen ion conductive polymer electrolyte membrane therebetween; and
    a pair of conductive separator plates including means for supplying and discharging a fuel gas to and from one of said electrodes and supplying and discharging an oxidant gas to and from the other electrode,
    wherein said conductive separator plates comprise molded plates of a composition comprising a binder, conductive carbon particles whose average particle diameter is not less than 50 µm and not more than ⅓ of a thickness of a thinnest portion of said conductive separator plate, and carbon nanotubes;
    wherein said carbon nanotubes have a diameter of 10 to 30 nm and a length of 1 to 10 µm; and
    wherein said binder is an acid-resisting resin.

2. The polymer electrolyte fuel cell as set forth in claim 1, further comprising carbon fine particles having a peak of particle size distribution at an average diameter of 30 to 100 nm.

3. The polymer electrolyte fuel cell as set forth in claim 1, wherein said composition further comprises a metallic filler.

4. The polymer electrolyte fuel cell as set forth in claim 3, wherein said metallic filler has a length-to-width ratio of not

TABLE 4

| | | | | | No. | | | |
|---|---|---|---|---|---|---|---|---|
| | | | 4-1 | 4-2 | 4-3 | 4-4 | 4-5 | 4-6 |
| Composition (wt %) | Binder | | 40 | 40 | 40 | 40 | 40 | 40 |
| | Carbon particle size distribution peak average diameter | <50 µm | 60 | | | 56 | | |
| | | 50-200 µm | | 60 | | | 56 | |
| | | 200 µm< | | | 60 | | | 56 |
| | | 30-100 nm | | | | 4 | 4 | 4 |
| Volume specific resistance (mΩ·cm) | | | 100 | 40 | 40 | 15 | 15 | 15 |
| Moldability | | | ◎ | ◎ | X | ◎ | ◎ | X |

TABLE 5

| | | | No. | | | | | | | | | |
|---|---|---|---|---|---|---|---|---|---|---|---|---|
| | | | 5-1 | 5-2 | 5-3 | 5-4 | 5-5 | 5-6 | 5-7 | 5-8 | 5-9 | 5-10 |
| Composition (wt %) | Binder | | 15 | 25 | 40 | 45 | 35 | 35 | 35 | 35 | 35 | 35 |
| | Carbon particle size distribution peak average diameter | 50-200 µm | 75 | 65 | 50 | 45 | 64.5 | 50 | 45 | 64.5 | 55 | 50 |
| | | 30-100 µm | 0 | 0 | 0 | 0 | 0 | 0 | 0 | 0.5 | 10 | 15 |
| | Silver powder | | 10 | 10 | 10 | 10 | 0.5 | 15 | 30 | 0 | 0 | 0 |
| Volume specific resistance (mΩ·cm) | | | 15 | 25 | 30 | 500 | 35 | 27 | 35 | 20 | 15 | 15 |
| Moldability | | | X | ○ | ◎ | ◎ | ◎ | ◎ | ◎ | ◎ | ◎ | ◎ | less than 2, and the width is not more than ⅓ of the thickness of the thinnest portion of said conductive separator plate.

5. The polymer electrolyte fuel cell as set forth in claim 3, wherein the metallic filler exposed on surfaces of said separator plates has been removed.

6. The polymer electrolyte fuel cell as set forth in claim 1, wherein said binder is a gastight elastic body having an acid resistance.

7. The polymer electrolyte fuel cell as set forth in claim 6, wherein said gastight elastic body comprises a polymer elastic body including polyisobutylene represented by the formula (1) or an ethylene propylene random copolymer represented by the formula (2) as a main-chain skeleton:

(1)

where X and Y are polymerizable functional groups, and m is an integer not less than 1 representing repetition number of isobutylene oligomer:

(2)

where X and Y are polymerizable functional groups, and l and m are integers not less than 1.

8. The polymer electrolyte fuel cell as set forth in claim 1, wherein said composition comprises 20 to 45 wt % of binder, 50 to 74 wt % of carbon nanotubes, and 0.5 to 10 wt % of conductive carbon fine particles.

9. The polymer electrolyte fuel cell as set forth in claim 8, further comprising 0.5 to 15 wt % of metallic filler.

10. The polymer electrolyte fuel cell as set forth in claim 1, wherein said carbon nanotubes partially protrude from surfaces of said separator plates.

* * * * *

UNITED STATES PATENT AND TRADEMARK OFFICE
CERTIFICATE OF CORRECTION

| | |
|---|---|
| PATENT NO. | : 7,452,624 B2 |
| APPLICATION NO. | : 10/312812 |
| DATED | : November 18, 2008 |
| INVENTOR(S) | : Kazuhito Hatoh et al. |

It is certified that error appears in the above-identified patent and that said Letters Patent is hereby corrected as shown below:

On the title page Item "(30) Foreign Application Priority Data", change the priority date from "Feb. 15, 2002" to --Feb. 15, 2001--.

Signed and Sealed this

Seventh Day of April, 2009

JOHN DOLL
*Acting Director of the United States Patent and Trademark Office*